United States Patent
Baladhandapani et al.

(10) Patent No.: US 11,829,140 B2
(45) Date of Patent: Nov. 28, 2023

(54) METHODS AND SYSTEMS FOR SEARCHLIGHT CONTROL FOR AERIAL VEHICLES

(71) Applicant: HONEYWELL INTERNATIONAL INC., Charlotte, NC (US)

(72) Inventors: Gobinathan Baladhandapani, Madurai (IN); Hariharan Saptharishi, Madurai (IN); Sivakumar Kangarajan, Bangalore (IN); Sunit Kumar Saxena, Urbana, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 324 days.

(21) Appl. No.: 17/223,137

(22) Filed: Apr. 6, 2021

(65) Prior Publication Data
US 2022/0260996 A1    Aug. 18, 2022

(30) Foreign Application Priority Data
Feb. 17, 2021    (IN) .............................. 202111006635

(51) Int. Cl.
*G05D 1/00* (2006.01)
*G05D 1/12* (2006.01)
*G08G 5/00* (2006.01)
*B64D 45/00* (2006.01)
*G05D 1/10* (2006.01)

(52) U.S. Cl.
CPC ........... *G05D 1/0094* (2013.01); *B64D 45/00* (2013.01); *G05D 1/106* (2019.05); *G05D 1/12* (2013.01); *G08G 5/0034* (2013.01)

(58) Field of Classification Search
CPC ........ G05D 1/0094; G05D 1/106; G05D 1/12; G05D 1/0044; B64D 45/00; B64D 47/02; G08G 5/0034; G08G 5/0026; G08G 5/0039; G08G 5/006; G08G 5/0069; G08G 5/0013
See application file for complete search history.

(56) References Cited

U.S. PATENT DOCUMENTS

| | | |
|---|---|---|
| 6,970,106 B2 | 11/2005 | Vial |
| 7,106,430 B2 | 9/2006 | Falbel |
| 8,905,587 B1 | 12/2014 | Bouckaert |

(Continued)

OTHER PUBLICATIONS

"E. Theunissen et al., Closing the ISR-Navigation Loop, Oct. 2010" (Year: 2010).*

*Primary Examiner* — Anne Marie Antonucci
*Assistant Examiner* — Connor L Knight
(74) *Attorney, Agent, or Firm* — LORENZ & KOPF, LLP

(57) ABSTRACT

Systems and methods for controlling a searchlight mounted to an aerial vehicle. The systems and methods receive angular data representing a directional angle of a beam of the searchlight and location data representing a global location of the aerial vehicle from a sensor system of the aerial vehicle. The systems and methods determine coverage of the beam of the searchlight on ground based on the angular data and the location data. Based on the coverage of the beam, the aerial vehicle is controlled to change the global location, the display is controlled to depict the coverage of the beam on a map including historical coverage of the beam, and/or the searchlight actuator is controlled to adjust the direction of the beam.

18 Claims, 3 Drawing Sheets

(56) References Cited

U.S. PATENT DOCUMENTS

| | | |
|---|---|---|
| 8,996,203 B2 | 3/2015 | Campbell et al. |
| 9,533,772 B2 | 1/2017 | Davalos et al. |
| 2003/0036827 A1* | 2/2003 | Murphy ................ G01S 17/89 |
| | | 701/3 |
| 2005/0225777 A1* | 10/2005 | Falbel .................. G01S 17/74 |
| | | 356/614 |
| 2006/0187027 A1* | 8/2006 | Smith ................... G01C 21/20 |
| | | 701/532 |
| 2007/0091609 A1 | 4/2007 | Solberg et al. |
| 2013/0182449 A1* | 7/2013 | Fidanza ................ B64D 47/04 |
| | | 362/470 |
| 2013/0239000 A1 | 9/2013 | Parkinson et al. |
| 2013/0261849 A1* | 10/2013 | Jungwirth ............. B64D 47/02 |
| | | 701/1 |
| 2015/0066248 A1* | 3/2015 | Arbeit ................... G08G 5/006 |
| | | 701/2 |
| 2015/0220142 A1 | 8/2015 | Parkinson et al. |
| 2016/0286175 A1* | 9/2016 | Dvorak ................ B64C 39/024 |
| 2020/0240602 A1 | 7/2020 | Huang |
| 2021/0016895 A1 | 1/2021 | Das et al. |
| 2021/0033692 A1 | 2/2021 | Harvey et al. |
| 2021/0323694 A1* | 10/2021 | Sanga ................... G10L 15/22 |
| 2021/0354795 A1* | 11/2021 | Moses ................... B64D 47/06 |
| 2022/0262263 A1* | 8/2022 | Elhossini ............. G05D 1/0094 |

\* cited by examiner

METHODS AND SYSTEMS FOR SEARCHLIGHT CONTROL FOR AERIAL VEHICLES

CROSS REFERENCE TO RELATED APPLICATION

This application claims priority to Indian Provisional Patent Application No. 202111006635, filed Feb. 17, 2021, the entire content of which is incorporated by reference herein.

TECHNICAL FIELD

The present disclosure generally relates to controlling searchlights for aerial vehicles.

BACKGROUND

Search and Rescue (SAR) missions are performed using aircraft, or any other vehicles, with specialized rescue teams and equipment to assist people in real or likely distress or other search missions including location debris of fallen aircraft. These include mountain rescue, ground search and rescue, air-sea rescue etc. Generally rotary wing or fixed wing aircraft are used for aerial SAR operations. Conventionally, a pilot of an SAR aircraft follows a particular flight plan/SAR pattern and flies at designated altitudes.

Search and Rescue operations over a large area by multiple aircraft needs careful co-ordination. The effectiveness of the SAR operation over a large area may be compromised for different reasons. For example, some of the SAR area may be missed during the SAR operation as there is no effective means available to report the completeness of area coverage during an SAR operation. In another example, the same area may be searched more than once as there is no accurate means available that reports the area searched so far.

Some Flight Management Systems (FMS) provide various pre-programmed SAR patterns yet the proper coverage of the target area may not be guaranteed with SAR flight plans. SAR effectiveness depends on several factors such as searchlight beam width, visibility, type of ground environment (forest, sea, dense terrain etc.), among other variables.

Accordingly, it is desirable to provide methods and systems to cover an SAR target area more efficiently and more effectively. Additionally, it is desirable to enhance situational awareness of coverage of an SAR mission. Furthermore, other desirable features and characteristics will become apparent from the subsequent detailed description and the appended claims, taken in conjunction with the accompanying drawings and the foregoing technical field and background.

BRIEF SUMMARY

Systems and methods are disclosed for controlling a searchlight mounted to an aerial vehicle. The systems and methods receive angular data representing a directional angle of a beam of the searchlight and location data representing a global location of the aerial vehicle from a sensor system of the aerial vehicle. The systems and methods determine coverage of the beam of the searchlight on ground based on the angular data and the location data. Based on the coverage of the beam, the aerial vehicle is controlled to change the global location, the display is controlled to depict the coverage of the beam on a map including historical coverage of the beam, and/or the searchlight actuator is controlled to adjust the direction of the beam.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
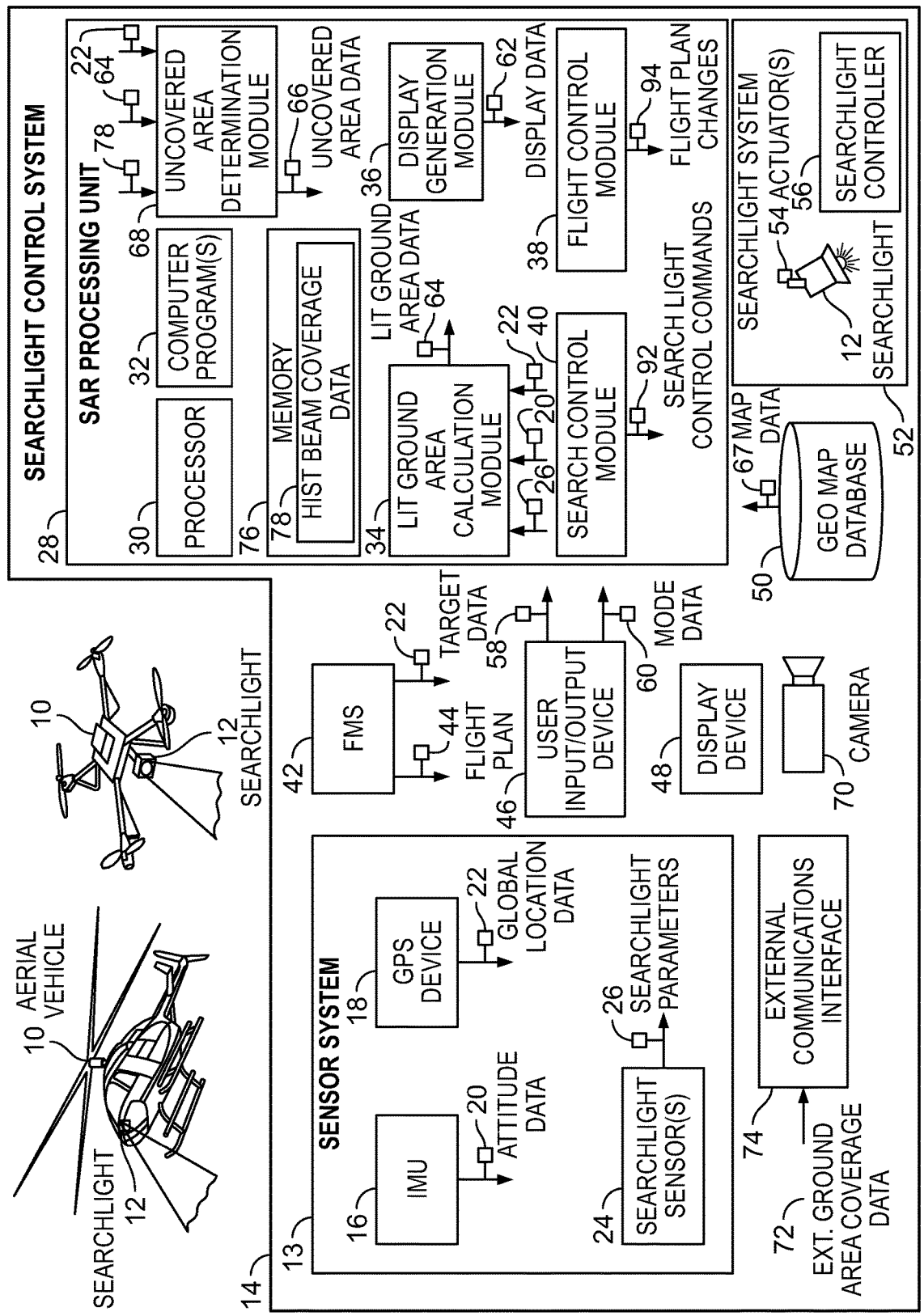
FIG. 1 illustrates a block diagram of a searchlight control system, in accordance with embodiments of the present disclosure.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Techniques and technologies may be described herein in terms of functional and/or logical block components and/or modules, and with reference to symbolic representations of operations, processing tasks, and functions that may be performed by various computing components or devices. Such operations, tasks, and functions are sometimes referred to as being computer-executed, computerized, software-implemented, or computer-implemented. It should be appreciated that the various block components and modules shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. In certain embodiments, the program or code segments or programming instructions are stored in a tangible processor-readable medium, which may include any medium that can store or transfer information. Examples of a non-transitory and processor-readable medium include an electronic circuit, a semiconductor memory device, a ROM, a flash memory, an erasable ROM (EROM), a floppy diskette, a CD-ROM, an optical disk, a hard disk, or the like.

Disclosed herein are systems and methods that assist SAR operations. The systems and methods ensure that the entire target search area is "visually" covered by the searchlight, ensure real-time feedback is provided to the pilot and the ground crew on the areas actually "searched" by the searchlight during an on-going SAR operation, ensure the searchlight is oriented and focused in directions provided by the pre-programmed SAR patterns computed by the FMS and/or ground crew and ensure SAR operation effectiveness is reported.

In embodiments described herein, an effective coverage region of an SAR operation is computed based on inputs including position of the searchlight illumination spot on ground and global position of the aircraft. The ground area (defined in terms of latitude and longitude) effectively covered during the SAR operation is computed based on at least these two inputs. The computed search and rescue area can be displayed on a map on a cockpit display, on a tablet display, etc. The map may be provided by a third party.

In embodiments, the computed effective SAR region is used to improve the effectiveness of the search mission by dynamically adjusting flight planning and Searchlight projection angle to focus on uncovered/missed-out areas.

In another embodiment, rather than aircraft continuously flying with programmed SAR patterns, it is proposed to generate the SAR pattern for rotary aircraft in which the rotorcraft hovers at a fixed point, whereas the Searchlight beam angle is commanded to several focus points to cover the sector/regions around that particular hovering point. Once the Searchlight has covered the entire sector around that particular hovering point, then the rotorcraft moves to the next hovering point as per the computed SAR pattern.

In the case of maritime search and rescue, the coverage region may be adapted in consideration of tidal movement.

In embodiments, a record is kept of the ground coverage area to support reporting the effectiveness of SAR operation to check if any area is left out or not.

In another embodiment, the searchlight automatically points in the direction required by SAR commands That is, the searchlight operates in the slave mode to the SAR commands. This mode reduces the operator workload significantly while ensuring an effective coverage of the SAR area.

Referring to FIG. 1, the searchlight control system 14 includes a lit ground area calculation module 34 that receives an angular orientation of a beam of a searchlight 12 from a sensor system 13 and receives a global position of an aerial vehicle from a Flight Management System (FMS) 42 or from the sensor system 13. The lit ground area calculation module 34 computes a ground area/region (LAT/LON) over which the beam of the searchlight 12 is illuminated based on the global position, the angular orientation of the beam and other searchlight parameters such as beam width, light intensity, etc.

In embodiments, the lit ground area (e.g. LAT and LON coordinates and radius or some other representation of location and size of the beam on the ground) is recorded in memory 76 along with a timestamp. In some embodiments, the timestamp, the longitude and latitude of the beam on the ground, the search light angle, the beam intensity and/or width and duration of illumination is recorded in the memory 76. In one embodiment, the searchlight control module 40 and the memory 76 including the historical beam coverage data are included as part of a searchlight controller 56 associated with the searchlight 12.

In embodiments, an SAR processing unit 28 receives a planned SAR pattern from the FMS 42 in the form of a flight plan 44 if an SAR pattern is available. If the SAR pattern is not available, an uncovered area determination module 68 compares the current ground area coverage from the lit ground area calculation module 34 against the historical beam coverage data 78 recorded in the memory 76. If the current beam coverage overlaps historical beam coverage, the searchlight direction is adjusted to focus on a different spot by sending a command to one or more actuator(s) 54 associated with the searchlight 12. If an SAP plan is available, the flight control module 38 can adjust the flight plan based on avoiding overlapping previously searched ground areas described in the historical beam coverage data 78 in such a way that the beam coverage can be maximized with less flying duration.

In embodiments, an SAR pattern for a rotary aircraft is generated in which the rotorcraft hovers at a fixed point whereas the beam angle of the searchlight 12 is commanded to several focus points to cover the sector/regions around that particular hovering point. Once the searchlight 12 has covered the entire sector around that hovering point, then the rotorcraft moves to the next hovering point as per the computed SAR pattern.

In embodiments, the searchlight 12 operates in a slave mode to SAR commands. The searchlight 12 automatically points in the direction required by SAR commands.

In embodiments, a display generation module 36 receives data on the ground size and location of the beam from the lit ground area calculation module 34 and the historical beam coverage data 78 and receives map data 67 from a geo map database 50 for a current search region. The generated display may include a graphical indication of beam coverage on the map, a graphical indication of a flown path of the aerial vehicle 10 on the map and a graphical indication of a future planned path (which may be received from the FMS 42) on the map. If the SAR mission is maritime, the indication of beam coverage is further based on tidal movement.

Accordingly, systems and methods described herein utilize feedback from a searchlight and plots a display to visually show the areas "so far" covered by the searchlight. The feedback from the searchlight is used to determine a ground position of the illumination spot. The searchlight may be controlled by the FMS 42 and moved in the direction provided by a pre-programmed SAR pattern.

Having summarized in the foregoing overall functions of searchlight control system 14, more detailed information will now be provided with reference to FIG. 1. FIG. 1 illustrates a searchlight control system 14 that includes a searchlight 12 mounted to an aerial vehicle 10, an SAR processing unit 28, a sensor system 13, an FMS 42, a user input/output device 46, a display device 48, a camera 70, an external communications interface 74 and a geo map database 50. The SAR processing unit 28 receives searchlight parameters 26 from the sensor system 13, global location data 22 for the aerial vehicle 10 and determines a ground area that is lit by the beam of the searchlight 12. The SAR processing unit 28 keeps a record of a historical beam coverage (included in historical beam coverage data 78) on the ground and generates a display of ground coverage, controls the location of the aerial vehicle 10 and/or controls the direction of the searchlight based on the historical beam coverage. Camera 70 and searchlight 12 are useful in a search and rescue mission or other mission in which searchlight 12 needs to be accurately controlled in order to improve visibility and identify a ground target. Aerial vehicle 10 is, in some embodiments, a rotorcraft such as a helicopter and other types of Vertical Take-Off and Landing (VTOL) aerial vehicle. However, fixed wing aircraft may also be included as the aerial vehicle 10. Manned or unmanned aerial vehicles have application according to the present disclosure. Searchlight 12 is, in one embodiment, an apparatus that combines an extremely bright source (e.g. at least 10,000 lumens) with a mirrored parabolic reflector to project a powerful beam of light of approximately parallel rays in a particular direction. Searchlight 12 is configured to allow swiveling so as to direct the beam to different positions on the ground. Multi-axis swiveling is possible and is effected through one or more actuators 54 such as electromotors under control based on control data from the SAR processing unit 28. In an embodiment, the searchlight 12 is included in a searchlight system 52 including one or more actuators 54, e.g. motors, for adjusting an angular direction of a beam of the searchlight 12 and a searchlight controller 56 for receiving commands from the SAR processing unit 28 and translating them to commands for the one or more actuators 54.

In embodiments, camera 70 includes one or more cameras that operate (primarily) in the visible spectrum or in the infrared spectrum or a combination thereof. In embodiments, camera 70 is part of an Enhanced Vision System (EVS). An EVS camera is an airborne system that captures a forward-looking scene so as to provide a display that is better than unaided human vision. EVS camera includes imaging sensors (one or more) such as a color camera and an infrared camera or radar. EVS camera includes, in embodiments, a millimeter wave radar (MMW) based imaging device, a visible low light television camera, one or more InfraRed cameras (possibly including more than one infrared camera operating at differing infrared wavelength ranges) and any combination thereof to allow sufficient imaging in poor visibility conditions (e.g. because of night time operation or because of inclement weather). The camera 70 may operate in synchronization with the searchlight 12 so as to provide live video of a spot on the ground lit by the searchlight 12.

In the exemplary embodiment, the sensor system 13 includes an inertial measurement unit (IMU) 16, a GPS device 18 and one or more searchlight sensor(s) 24. The IMU 16 provides attitude data 20 for the aerial vehicle 10 including pitch, roll and yaw, which represents and orientation of the aerial vehicle 10. The searchlight sensor(s) 24 provides searchlight parameters 26 including beam angle with respect to the aerial vehicle 10 and other searchlight parameters including beam intensity, beam width and beam focus. The beam angle may be sensed by an encoder wheel or other position sensor associated with the actuator(s) 54. The searchlight sensor(s) is shown conceptually as part of the sensor system 13 but may be physically located in the searchlight system 52 in connection with the searchlight 12. The beam angle is derived from a central beam axis in a local coordinate frame of the aerial vehicle 10. The beam angle may be a two or three-dimensional vector. The GPS device 18 includes a GPS receiver for receiving signals from satellites and, based thereon, determining a global location of the aerial vehicle in terms of longitude, latitude and altitude.

Figure 2:
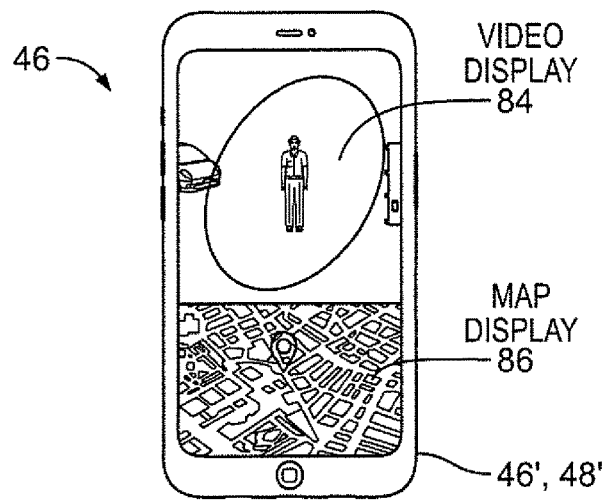
FIG. 2 illustrates an integrated user input device and display device included in the searchlight control system, in accordance with embodiments of the present disclosure.

The user input/output device 46 includes one or more of a keyboard, joystick, multi-way rocker switches, mouse, trackball, touch screen, touch pad, data entry keys, a microphone suitable for voice recognition, and/or any other suitable device. The user input/output device 46 allows a user to define an SAR target area, to specify a mode of operation of the SAR processing unit 28 and to otherwise interact with the various components of the searchlight control system 14. The user input/output device 46 may additionally include a display device such as the display device 48 in order to display live video from the camera 70 and a depiction of covered and uncovered ground areas derived from data from the SAR processing unit 28 as described further below. An example of the user input/output device 46', 48' is shown in FIG. 2 including a split screen including a video display 84 showing live video from the camera 70 and a map display 86 showing SAR information on a map as will be described further with reference to FIGS. 3 and 4. The map and video displays 84, 86 may be shown separately in another embodiment. The user input/output device 46', 48' allows a user to direct the searchlight 12 (when this is not controlled automatically), to define the SAR target area and to set a mode of operation of the SAR processing unit 28 using, in this embodiment, a touchscreen data entry mechanism.

The SAR processing unit 28 comprises a computer system. In the depicted embodiment, the computer system of the SAR processing unit 28 includes a processor 30, a memory 76 and one or more computer program(s) 32. The processor 30 performs the computation and control functions of the SAR processing unit 28, and may comprise any type of processor or multiple processors, single integrated circuits such as a microprocessor, or any suitable number of integrated circuit devices and/or circuit boards working in cooperation to accomplish the functions of a processing unit. During operation, the processor 30 executes one or more computer programs 32 contained within the memory 76 and, as such, controls the general operation of the SAR processing unit 28 generally in executing the processes described herein, such as the method 200 described further below in connection with FIG. 5. The one or more computer programs 32 include at least a lit ground area calculation module 34, a display generation module 36, a searchlight control module 40 and a flight control module 38 for performing functions described herein and the method 200 described in detail below.

The processor 30 is capable of executing one or more programs (i.e., running software) to perform various tasks encoded in the program(s) 32. The processor 30 may be a microprocessor, microcontroller, application specific integrated circuit (ASIC) or other suitable device as realized by those skilled in the art.

The memory 76 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 76 is located on and/or co-located on the same computer chip as the processor 30. The memory 76 may additionally or alternatively include a storage device, which can be any suitable type of storage apparatus, including direct access storage devices such as hard disk drives, flash systems, floppy disk drives and optical disk drives. In one exemplary embodiment, the storage device comprises a program product from which memory 76 can receive a program 32 (including computer modules 34, 36, 38, 40) that executes one or more embodiments of one or more processes of the present disclosure, such as the steps of the method 200 (and any sub-processes thereof). In another exemplary embodiment, the program product may be directly stored in and/or otherwise accessed by the memory 76 and/or a disk (e.g., disk), such as that referenced below. The geo map database 50 may be stored on the memory 76.

Figure 3:
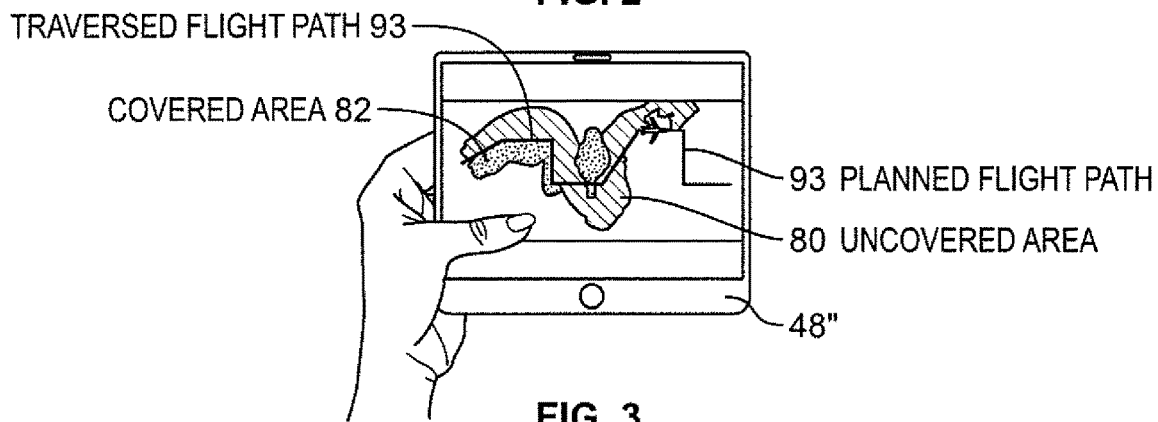
FIG. 3 illustrates a display device included in the searchlight control system, in accordance with embodiments of the present disclosure.
Figure 4:
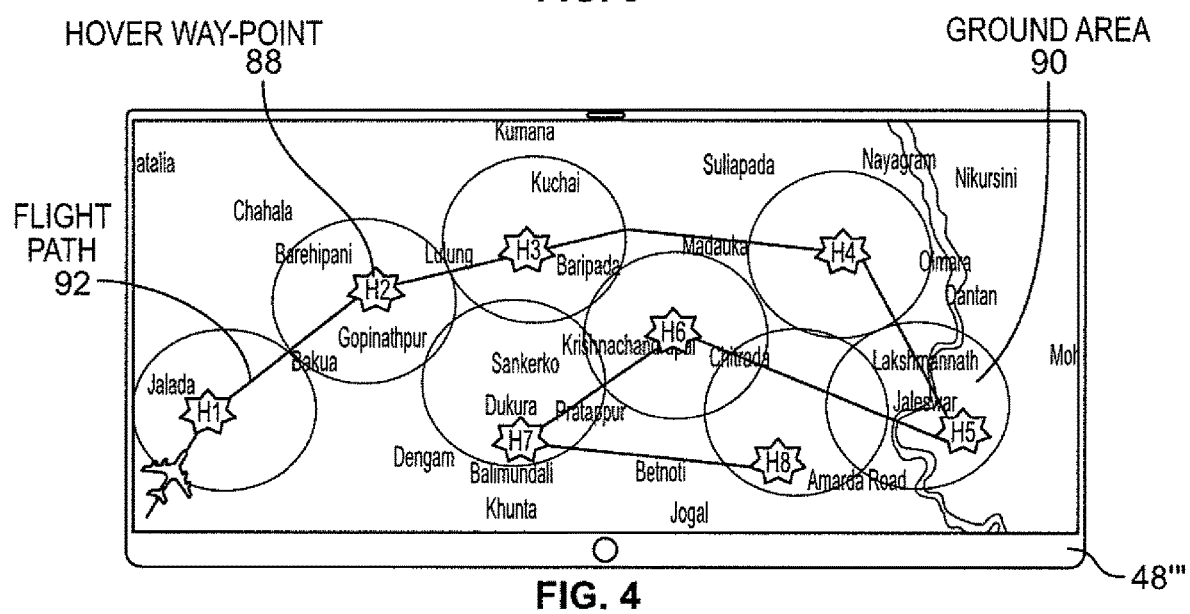
FIG. 4 illustrates another display device included in the searchlight control system, in accordance with embodiments of the present disclosure.

The display device 48 includes Electroluminescent (ELD) displays, Liquid crystal displays (LCD), Light-emitting diode (LED) displays, Plasma (PDP) displays, etc. In embodiments, the display device 48 includes a head down display (HDD), a head up display (HUD), a wearable HUD, a portable display or any combination thereof. The display device 48 may be dashboard/cockpit integrated display or an Electronic Flight Bag (EFB) device. The display device 48 receives display data from the display generation module 36 and presents a display to the driver or pilot illustrating ground areas that have been lit by the beam of the searchlight 12, as illustrated in FIGS. 3 and 4.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 30) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the SAR processing unit 28 may also otherwise differ from the embodiment depicted in FIG. 2, for example in that the computer system of the SAR processing unit 28 may be coupled to or may otherwise utilize one or more remote computer systems and/or other control systems.

The SAR processing unit 28 may receive a flight plan 44 or an indication of a target region in target data 58 for an SAR mission. The flight plan 44 is provided by the FMS 42 and the target data 58 is provided based on user selections through the user input/output device 46. Alternatively, target data 58 indicating a target SAR region may be provided to the FMS 42 based on selections made by a user based on selection made using the user input/output device 46. The FMS 42 generates the flight plan 44 based on predetermined SAR patterns filling the target area or based on a dynamically determined flight plan calculated to fill the target area in minimal time, distance or fuel usage. In another alternative, the target data 58 is provided to the SAR processing unit 28 to directly determine a flight plan 44, as will be described further below. The FMS 42 may track the location of the aerial vehicle 10 along the flight plan 44 based at least on the output of the GPS device 18. The FMS 42 can provide global location data 22 representing a current global location of the aerial vehicle 10.

The SAR processing unit 28 includes a lit ground area calculation module 34 that calculates a ground area lit by the searchlight 12 based at least on the beam angle in the searchlight parameters 26 and the global location data 22 from the FMS 42 or the GPS device 18. The lit ground area calculation module 34 outputs current lit ground area data 64 for subsequent processing. The altitude of the aerial vehicle 10 in the global location data 22 may be converted from relative to sea level to relative to ground using terrain data included in the geo map database 50. The lit ground area calculation module 34 is able to transform the beam angle and the global location of the aerial vehicle 10 into a position on the ground that is lit by the searchlight 12. This transformation may make use of additional searchlight parameters 26 including rate of beam divergence with distance from the searchlight 12, beam focus, beam width and beam intensity. The transformation can be established from first principles or an empirically derived look up table may be utilized or a combination thereof. Since the beam angle is provided relative to a local coordinate frame of the aerial vehicle 10, the attitude data 20 of the aerial vehicle 10 may be used to accurately determine the global orientation of the beam of the searchlight 12. Alternatively, an assumption may be made that the aerial vehicle 10 is operating parallel to the ground. The lit ground area calculation module 34 provides a current ground area (e.g. location and size) of the searchlight beam projected onto the ground and also keeps a record of previous calculations in the memory 76 as part of historical beam coverage data 78. The historical beam coverage data 78 may be collected in association with a particular SAR mission as defined by the flight plan 44 or as designated in the target data 58. The lit ground area calculation module 34 may provide current and historical data for an SAR mission including timestamp, global location of central axis of the beam impingement on the ground (e.g. in terms of latitude and longitude) and the beam size where it impinges on the ground (e.g in terms of beam width or radius in length or angular coordinates). The data may be collected at regular intervals to allow plotting and following of the impingement of the beam on the ground.

In one embodiment, the lit ground area calculation module 34 receives external ground area coverage data 72 through an external communications interface 74 such as a ground to air broadcast or broadcast between aerial vehicles included in an SAR mission. The external ground area coverage data 72 provides data on when and where beams from searchlights of other aerial vehicles 10 have projected onto the ground. The lit ground area calculation module 34 can track searchlight beam ground coverage from not only the ownship but also for other aerial vehicles and store this information in historical beam coverage data 78 to allow for coordinated beam coverage plotting and to ensure that searching patterns are not repeated.

The uncovered area determination module 68 determines whether a currently lit ground area, embodied by lit ground area data 64, has already been searched by comparison with the historical beam coverage data 78. In one embodiment, the uncovered area determination module 68 may provide a binary output of true of false depending on whether the lit ground area data 64 represents a ground area already covered by the SAR mission. In another embodiment, the uncovered area determination module determines a total region that can be lit by the searchlight 12 based on maximum angles of movement of the searchlight and the current global location of the aerial vehicle (which is embodied in global location data 22). The uncovered area determination module 68 may compare the total region that can be lit by the searchlight 12 and the historical beam coverage to determine ground areas that have not yet been covered and can be reached from the current position of the aerial vehicle 10. The uncovered area determination module 68 may also provide an indication that all areas from the current position of the aerial vehicle 10 have been covered by a searchlight. The uncovered area determination module 68 may thus output, as part of uncovered area data 66, a true of false indication of whether the current projection of the beam overlaps with previous beam coverage and optionally also outputs any area of possible beam coverage that has not yet been lit.

In embodiments, the searchlight control module 40 determines searchlight control commands 92 for execution by the one or more actuators 54 of the searchlight 12 to control at least beam angular direction and optionally also beam width, focus and intensity. The searchlight control module 40 may determine the searchlight control commands 92 based on uncovered area data 66. In one embodiment, the uncovered area data 66 indicates whether a current beam direction illuminates a ground area that has already been lit. If so, the searchlight control module 40 generates searchlight control commands 92 to re-direct the beam to an area that has not yet been covered, if available at the current location of the aerial vehicle. The searchlight control module 40 can determine ground areas that have not yet been lit that can be reached by the searchlight 12 from the current location of the aerial vehicle 10 based on a corresponding indication in the uncovered area data 66.

In embodiments, the flight control module 38 determines flight plan changes 94 for execution by the FMS 42 (and ultimately by autopilot actuators of the aerial vehicle 10) in order to ensure the searchlight 12 is illuminating new ground areas. That is, the flight control module 38 receives the uncovered area data 66 and, if the current location of the aerial vehicle 10 is associated with ground that has already been covered by the searchlight beam of the aerial vehicle 10 or another aerial vehicle 10, then the flight control module 38 determines flight plan changes 94 so that the beam of the searchlight 12 can reach ground areas that have not yet been covered according to the historical beam coverage data 78. In some embodiments, the searchlight control module 40 and the flight control module 38 operate in tandem so that the searchlight 12 is controlled and the flight plan 44 is approximately followed to ensure that the beam of the searchlight 12 is optimally directed at ground areas that have not yet been lit for as much of the SAR mission as possible. That is, the searchlight 12 will be re-directed and the position of the aerial vehicle 10 will be adjusted based on the historical beam coverage data 78 so as to illuminate new ground areas with the searchlight beam. In other embodiments, the SAR processing unit 28 can separately operate in an automatic searchlight control mode controlled by the searchlight control module 40 or in a flight plan adaption mode controlled by the flight control module 38. These modes may be selected by the user input/output device 46. That is, when the aerial vehicle 10 approaches a previously covered location as described in the historical beam coverage data 78 (in terms of latitude and longitude), the beam angle of the searchlight 12 is adjusted in such a way that it is focusing on a new ground location that was not covered before according to the historical beam coverage data 78. Additionally, or alternatively, the flight plan 44 can be updated based on past coverage if needed and sent to the FMS 45 for execution.

In one embodiment, the SAR processing unit 28 implements a hover and scan SAR mode. The hover and scan mode may be selected by a user through the user input/output device 46, by the FMS 42 or otherwise. In the hover and scan mode, the aerial vehicle 10 follows a flight plan that includes a plurality of hover waypoints 88 as illustrated in FIG. 4. At each hover waypoint 88, the aerial vehicle 10 is controlled to hover in place and the searchlight control module 40 issues searchlight control commands 92 to scan through the full range of angles of the searchlight 12 to thereby maximally illuminate the ground to a full extent of possible coverage based on the movement range of the searchlight 12 and the current position of the aerial vehicle 10. The hover waypoints 88 may be defined so as to be spaced in such a way that the ground illumination of one hover waypoint 88 connects with the ground illumination from neighboring hover waypoints 88. That is, the FMS 42 or the SAR processing unit 28 selects hover waypoints 88 that are spaced based on an angular range of operation of the searchlight 12.

In embodiments, the display generation module 36 generates a graphical depiction of area on the ground that has been illuminated by the beam of the searchlight 12 based on the historical beam coverage data 78. The graphical depiction is overlaid on a map to allow a user to easily identify areas that have been lit and those that have not. The map is drawn based on map data 67 from the geo map database 50. The display generation module 36 graphically paints the map based on where the ground has been illuminated by the beam of the searchlight 12. In the exemplary embodiment of FIG. 3, the display device 48", which is a tablet device in this embodiment, depicts a traversed flight path 93 differently from an upcoming planned flight path 96. This information can be plotted based on the flight plan 44 and other data from the FMS 42. FIG. 3 further illustrates covered areas 82 based on historical beam coverage data 78. Yet further, the uncovered area determination module 68 may determine ground areas that are within reach of the searchlight 12 of the aerial vehicle 10 following the flight path defined by the flight plan 44 but have not yet been illuminated. These areas are marked as uncovered area 80 and are depicted on the map differently from the covered areas 82.

In the example display device 48" of FIG. 4, which is a cockpit display device, a flight path 92 is depicted when the SAR processing unit 28 is operating in a hover and scan mode. The flight path 92 includes a plurality of hover waypoints 88 and a range ring (or other shape) depicting ground areas 90 around each hover waypoint 88 that have been illuminated by the searchlight 12 based on the historical beam coverage data 78.

Figure 5:
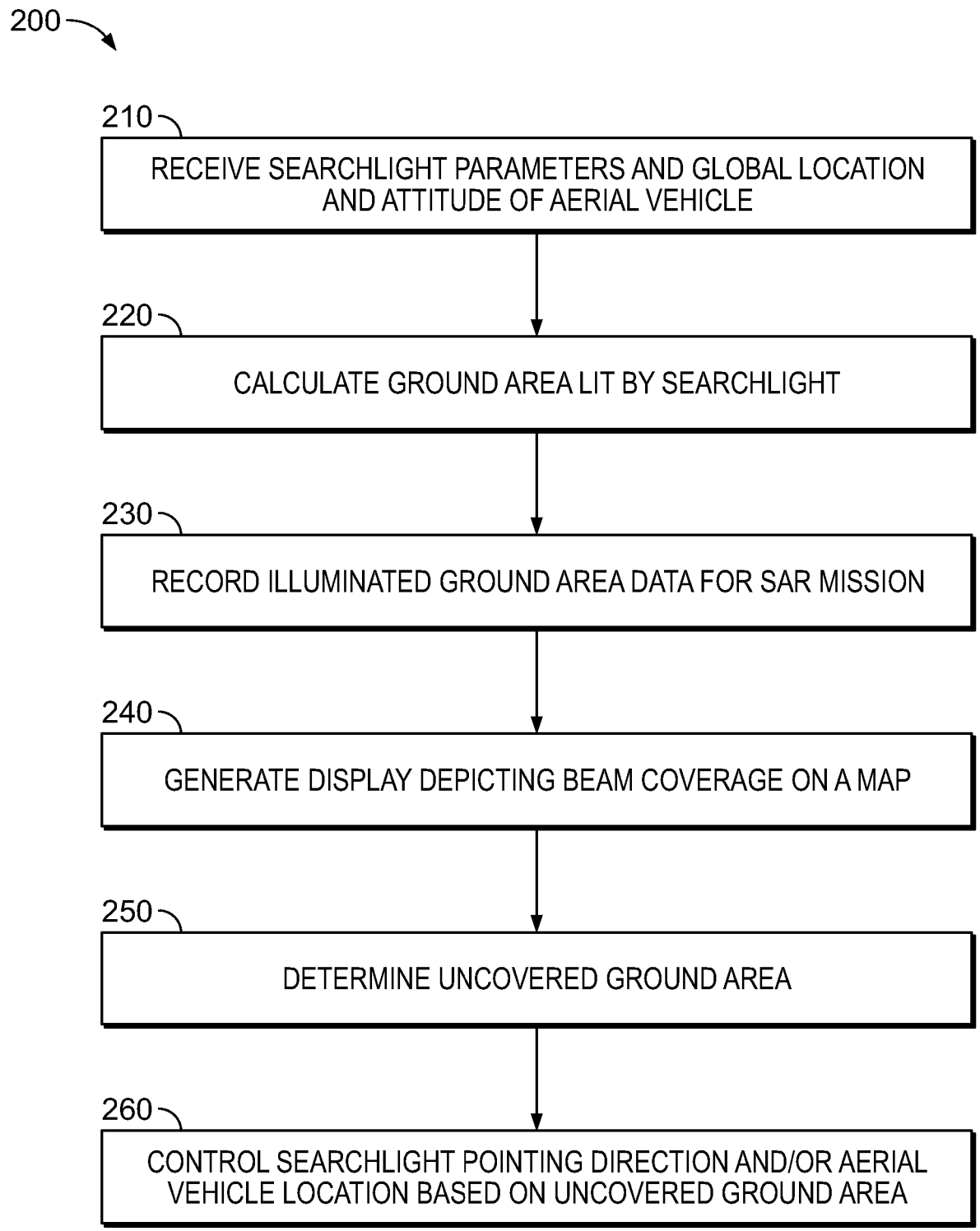
FIG. 5 illustrates a flowchart of a method of operating the searchlight control system of FIG. 1, in accordance with embodiments of the present disclosure.

FIG. 5 illustrates a flowchart of a method 200 of operating a searchlight control system 14, in accordance with various exemplary embodiments. The various tasks performed in connection with method 200 may be performed by software (e.g. program instructions executed by one or more processors), hardware, firmware, or any combination thereof. For illustrative purposes, the following description of method 200 may refer to elements mentioned above in connection with FIG. 1. It should be appreciated that method 200 may include any number of additional or alternative tasks, the tasks shown in FIG. 2 need not be performed in the illustrated order, and method 200 may be incorporated into a more comprehensive procedure or process having additional functionality not described in detail herein. Moreover, one or more of the tasks shown in FIG. 2 could be omitted from an embodiment of the method 200 as long as the intended overall functionality remains intact. Method 200 is described in terms of being performed by one or more processors 30 of the SAR processing unit 28 executing instructions of computer program 32 stored on non-transitory memory 76.

In step 210 searchlight parameters 26 are received by the SAR processing unit 28 from the searchlight controller 56, which is in communication with searchlight sensors 24. Further, global location data 22 is received concerning the global location of the aerial vehicle and attitude data 20 concerning the pitch, roll and yaw of the aerial vehicle 10 is received by the SAR processing unit 28. In step 220, the SAR processing unit 28 calculates the ground area currently being lit by the searchlight 12 based on projecting the beam of the searchlight 12 onto the ground using the searchlight parameters 26, the global location data 22 and the attitude data 20. In step 230, the SAR processing unit 28 maintains a record of ground area that has been illuminated on the basis of the calculations of step 220. The record is stored as part of historical beam coverage data 78. The record may be maintained in association with a particular SAR mission. The SAR mission may have beginning and end points based on the aerial vehicle 10 taking off and landing, based on when the aerial vehicle enters and exits a target area or based on a flight plan defining a start and end of an SAR mission.

In step 240, a display is generated depicting beam coverage on a geographical map. That is, the historical beam coverage data 78 describes ground size and location of the beam of the searchlight 12. The historical beam coverage data 78 may include corresponding searchlight beam coverage data from other aerial vehicles that has been reported through external communications interface 74. The display can graphically paint, or otherwise illustrate, historical areas that have been illuminated by a searchlight beam as exemplified in FIGS. 3 and 4. The display may be provided on a tablet device, a cockpit display device, a ground display or any other suitable display.

In step 250, uncovered ground area is determined based on current location of the aerial vehicle 10, the flight plan 44 and the historical beam coverage data 78. The current location of the aerial vehicle 10, the flight plan 44 and known capabilities of the searchlight 12 allows a determination of ground areas that could feasibly be illuminated by the searchlight 12 of the aerial vehicle 10. The area difference between the feasible ground area to be illuminated and the historical beam coverage area represents uncovered area, which may be described in uncovered area data 66.

In step 260, the pointing direction of the searchlight 12 and/or the global location of the aerial vehicle 10 is controlled based on the uncovered area from step 250. That is, the searchlight and/or the aerial vehicle location is controlled so that the searchlight at least approximately follows the flight plan 44 and also illuminates new, as yet unlit, areas of the ground. In an alternative operation of steps 250 and 260, the SAR processing unit 28 determines whether the current ground location being lit overlaps with ground area that has already been lit according to the historical beam coverage data 78 and adjusts the beam direction and/or the location of the aerial vehicle in a control loop until unlit ground area is found and illuminated. Generally, the SAR processing unit 28 control the searchlight 12 and the location of the aerial vehicle 10 during an SAR mission in order to algorithmically minimize repeat light of ground area as described in the historical beam coverage data 78. As described hereinabove, the historical beam coverage data 78 can include beam coverage information from other aerial vehicles working the SAR mission.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A searchlight control system for an aerial vehicle, comprising:
    a searchlight adapted to be mounted to the aerial vehicle;
    a searchlight actuator for adjusting a direction of a beam of the searchlight;
    a sensor system configured to output angular data representing a directional angle of the beam of the searchlight with respect to the aerial vehicle and location data representing a global location of the aerial vehicle;
    at least one processor in operable communication with the sensor system and the searchlight actuator, the at least one processor configured to execute program instructions, wherein the program instructions are configured to cause the at least one processor to:
        determine coverage of the beam on ground based on the angular data and the location data; and performing, based on the coverage of the beam, at least one of:
        controlling the aerial vehicle to change the global location;
    controlling a display to depict the coverage of the beam on a map including historical coverage of the beam; and
    controlling the searchlight actuator to adjust the direction of the beam,
    wherein the program instructions are further configured to cause the at least one processor to receive a flight plan including a plurality of hover waypoints, to control the searchlight actuator and the aerial vehicle to hover at each hover waypoint and to adjust the direction of the beam to maximal ground coverage whilst the aerial vehicle hovers at the hover waypoint.

2. The searchlight control system of claim 1, wherein the program instructions are configured to cause the at least one processor to:
    receive a search and rescue (SAR) target area;
    update a record of historical coverage of the beam based on currently determined coverage of the beam, wherein the record of historical coverage of the beam is stored in a memory of the searchlight control system;
    compare the SAR target area and the historical coverage of the beam; and
    perform, based on the comparison, at least one of:
    controlling the aerial vehicle to change the global location to direct the beam of the searchlight to uncovered area on the ground; and
    controlling the searchlight actuator to adjust the direction of the beam to direct the beam of the search to uncovered area on the ground.

3. The searchlight control system of claim 1, wherein the sensor system is configured to provide attitude data for the aerial vehicle representing an orientation of the aerial vehicle and wherein the program instructions are configured to cause the at least one processor to determine coverage of the beam on the ground based on the angular data, the attitude data and the location data.

4. The searchlight control system of claim 1, wherein the sensor system is configured to provide at least one of beam dimension and beam intensity and wherein the program instructions are configured to cause the at least one processor to determine coverage of the beam on the ground based on the angular data, the location data and the at least one of beam dimension and beam intensity.

5. The searchlight control system of claim 1, wherein the program instructions are configured to cause the at least one processor to control the display to depict the coverage of the beam on the map by graphically distinguishing covered and uncovered ground areas.

6. The searchlight control system of claim 1, wherein determining the coverage of the beam on ground is based on the angular data, the location data and tidal movement in maritime search and rescue missions.

7. The searchlight control system of claim 1, comprising a user input device through which a user can identify a search and rescue target area on the map, wherein the program instructions are configured to cause the at least one processor to control the aerial vehicle to change the global location and/or control the searchlight actuator to adjust the direction of the beam based additionally on the SAR target area.

8. The searchlight control system of claim 1, wherein the program instructions are configured to cause the at least one processor to:
receive a search and rescue (SAR) target area;
receive external data on coverage of a searchlight beam on the ground of at least one other aerial vehicle;
compare the SAR target area, the coverage of the beam for the aerial vehicle and the coverage of the searchlight beam from the external data; and
perform, based on the comparison, at least one of:
controlling the aerial vehicle to change the global location to direct the beam of the searchlight to uncovered area on the ground; and
controlling the searchlight actuator to adjust the direction of the beam to direct the beam of the searchlight to uncovered area on the ground.

9. The searchlight control system of claim 1, wherein the program instructions are configured to cause the at least one processor to:
receive a search and rescue (SAR) flight pattern from a Flight Management System (FMS);
determine uncovered area on the ground not covered by the beam based on historical data regarding coverage of the beam on the ground; and
control the aerial vehicle to change the global location to direct the beam of the searchlight to the uncovered area by adjusting the flight pattern, and/or control the searchlight actuator to adjust the direction of the beam to direct the beam of the searchlight to the uncovered area on the ground.

10. A method of controlling a searchlight mounted to an aerial vehicle, the method comprising:
receiving, via at least one processor, angular data representing a directional angle of a beam of the searchlight with respect to the aerial vehicle and location data representing a global location of the aerial vehicle from a sensor system of the aerial vehicle;
determining, via the at least one processor, current coverage of the beam of the searchlight on ground based on the angular data and the location data;
update a record of historical coverage of the beam based on current coverage of the beam, wherein the record of historical coverage of the beam is stored in a memory of the searchlight control system; and
performing, based on the historical coverage of the beam, at least one of:
controlling, via the at least one processor, the aerial vehicle to change the global location;
controlling, via the at least one processor, a display to depict the coverage of the beam on a map including historical coverage of the beam;
controlling, via the at least one processor, the searchlight actuator to adjust the direction of the beam;
receiving, via the at least one processor, a flight plan including a plurality of hover waypoints; and
controlling, via the at least one processor, the searchlight actuator and the aerial vehicle to hover at each hover waypoint and to adjust the direction of the beam to maximal ground coverage whilst the aerial vehicle hovers at the hover waypoint.

11. The method of claim 10, comprising:
receiving, via the at least one processor, a search and rescue (SAR) target area;
comparing, via the at least one processor, the SAR target area and the coverage of the beam; and
performing, based on the comparison, at least one of:
controlling, via the at least one processor, the aerial vehicle to change the global location to direct the beam of the searchlight to uncovered area on the ground; and
controlling, via the at least one processor, the searchlight actuator to adjust the direction of the beam to direct the beam of the searchlight to uncovered area on the ground.

12. The method of claim 10, comprising determining coverage of the beam on the ground is based on the angular data, attitude data for the aerial vehicle representing an orientation of the aerial vehicle and the location data.

13. The searchlight control system of claim 10, wherein determining coverage of the beam on the ground is based on the angular data, the location data and at least one of beam dimension and beam intensity.

14. The method of claim 10, controlling, via the at least one processor, the display to depict the coverage of the beam on the map by graphically distinguishing covered and uncovered ground areas.

15. The method of claim 10, wherein determining the coverage of the beam on ground is based on the angular data, the location data and tidal movement in maritime search and rescue missions.

16. The method of claim 10, comprising receiving, via the at least one processor, an identification of a search and rescue (SAR) target area on the map through a user input device and controlling, via the at least one processor, the aerial vehicle to change the global location and/or controlling, via the at least one processor, the searchlight actuator to adjust the direction of the beam based additionally on the SAR target area.

17. The method of claim 10, comprising:
receiving, via the at least one processor, a search and rescue (SAR) target area;
receiving, via the at least one processor, external data on coverage of a searchlight beam on the ground of at least one other aerial vehicle;
comparing, via the at least one processor, the SAR target area, the coverage of the beam for the aerial vehicle and the coverage of the searchlight beam from the external data; and
performing, via the at least one processor, based on the comparison, at least one of:
controlling the aerial vehicle to change the global location to direct the beam of the searchlight to uncovered area on the ground; and
controlling the searchlight actuator to adjust the direction of the beam to direct the beam of the searchlight to uncovered area on the ground.

18. The method of claim 17, comprising:
receiving, via the at least one processor, a search and rescue (SAR) flight pattern from a Flight Management System (FMS);
determining, via the at least one processor, the uncovered area on the ground not covered by the beam based on historical data regarding coverage of the beam on the ground; and
controlling, via the at least one processor, the aerial vehicle to change the global location to direct the beam of the searchlight to the uncovered area by adjusting the flight pattern, and/or control the searchlight actuator to adjust the direction of the beam to direct the beam of the search to the uncovered area on the ground.

* * * * *